United States Patent
Saito et al.

(10) Patent No.: US 11,091,159 B2
(45) Date of Patent: Aug. 17, 2021

(54) REAR VIEW MONITORING DEVICE

(71) Applicant: TOYOTA JIDOSHA KABUSHIKI KAISHA, Toyota (JP)

(72) Inventors: Noriyuki Saito, Toyota (JP); Takuya Kaminade, Okazaki (JP); Iwao Izumikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/362,005

(22) Filed: Mar. 22, 2019

(65) Prior Publication Data

US 2019/0299986 A1 Oct. 3, 2019

(30) Foreign Application Priority Data

Mar. 29, 2018 (JP) .............................. JP2018-063556

(51) Int. Cl.
*B60W 30/095* (2012.01)

(52) U.S. Cl.
CPC ..... *B60W 30/0956* (2013.01); *B60W 2554/00* (2020.02)

(58) Field of Classification Search
CPC .. B60K 28/10; B60K 37/06; B60K 2370/179; B60K 2370/197; B60K 2370/794; B60Q 9/008; B60W 2554/00; B60W 30/0956; G01S 2013/93272; G01S 2013/93274; G01S 13/931
USPC .......................................................... 701/49
See application file for complete search history.

(56) References Cited

U.S. PATENT DOCUMENTS

| 10,613,219 B1* | 4/2020 | DeCia ................... G01S 13/931 |
| 10,895,471 B1* | 1/2021 | Chan ...................... G01C 21/32 |
| 10,977,907 B1* | 4/2021 | Zalewski ........... G06Q 30/0633 |
| 2007/0188312 A1* | 8/2007 | Bihler ................ B60R 21/0134 340/435 |
| 2011/0238309 A1* | 9/2011 | Tsunekawa ............ G08G 1/165 701/301 |
| 2014/0222298 A1* | 8/2014 | Gurin .................... B60R 25/305 701/49 |
| 2015/0035685 A1* | 2/2015 | Strickland .............. B60Q 1/525 340/901 |

(Continued)

FOREIGN PATENT DOCUMENTS

| CN | 107201861 A | * | 9/2017 | .......... B60R 13/005 |
| CN | 107351761 A | * | 11/2017 | |

(Continued)

*Primary Examiner* — Atul Trivedi
(74) *Attorney, Agent, or Firm* — Oblon, McClelland, Maier & Neustadt, L.L.P.

(57) ABSTRACT

A control ECU (10) executes left-side preliminary control for preventing an occupant from performing an operation of opening a left door when an object is predicted to reach a left virtual line segment (LVL) based on a position of the object. The control ECU executes right-side preliminary control for preventing the occupant from performing an operation of opening a right door when the object is predicted to reach a right virtual line segment (RVL) based on the position of the object. Further, the control ECU executes both-side preliminary control for preventing the occupant from performing an operation of opening both of the left door and the right door when the object is predicted to reach a central virtual line segment (CVL).

8 Claims, 4 Drawing Sheets

(56) References Cited

U.S. PATENT DOCUMENTS

| | | | |
|---|---|---|---|
| 2015/0061895 A1* | 3/2015 | Ricci | G06Q 10/20 |
| | | | 340/902 |
| 2016/0332562 A1* | 11/2016 | Kim | B60Q 1/34 |
| 2016/0357187 A1* | 12/2016 | Ansari | G01S 13/862 |
| 2017/0248949 A1* | 8/2017 | Moran | G08G 1/165 |
| 2017/0248950 A1* | 8/2017 | Moran | G05D 1/0055 |
| 2018/0037226 A1* | 2/2018 | Otake | B60W 50/0098 |
| 2018/0336786 A1* | 11/2018 | Salter | B60Q 1/323 |
| 2019/0079526 A1* | 3/2019 | Vallespi-Gonzalez | |
| | | | G01S 17/931 |
| 2019/0092343 A1* | 3/2019 | Hoshikawa | B60W 50/0097 |
| 2019/0302253 A1* | 10/2019 | Santra | G01S 7/354 |
| 2020/0033124 A1* | 1/2020 | Lee | G01S 13/931 |
| 2020/0157873 A1* | 5/2020 | Sabatini | B60Q 1/323 |
| 2020/0307562 A1* | 10/2020 | Ghafarianzadeh | |
| | | | G06K 9/00791 |
| 2020/0307563 A1* | 10/2020 | Ghafarianzadeh | |
| | | | B60W 60/00274 |
| 2020/0344450 A1* | 10/2020 | Lang | B60R 1/00 |
| 2020/0356791 A1* | 11/2020 | Raichelgauz | G08G 1/04 |

FOREIGN PATENT DOCUMENTS

| | | | | |
|---|---|---|---|---|
| CN | 111038381 A | * | 4/2020 | |
| CN | 105936275 B | * | 6/2020 | B60K 35/00 |
| JP | 2002-22828 | | 1/2002 | |
| WO | WO-2014045799 A1 | * | 3/2014 | B62D 15/028 |

* cited by examiner

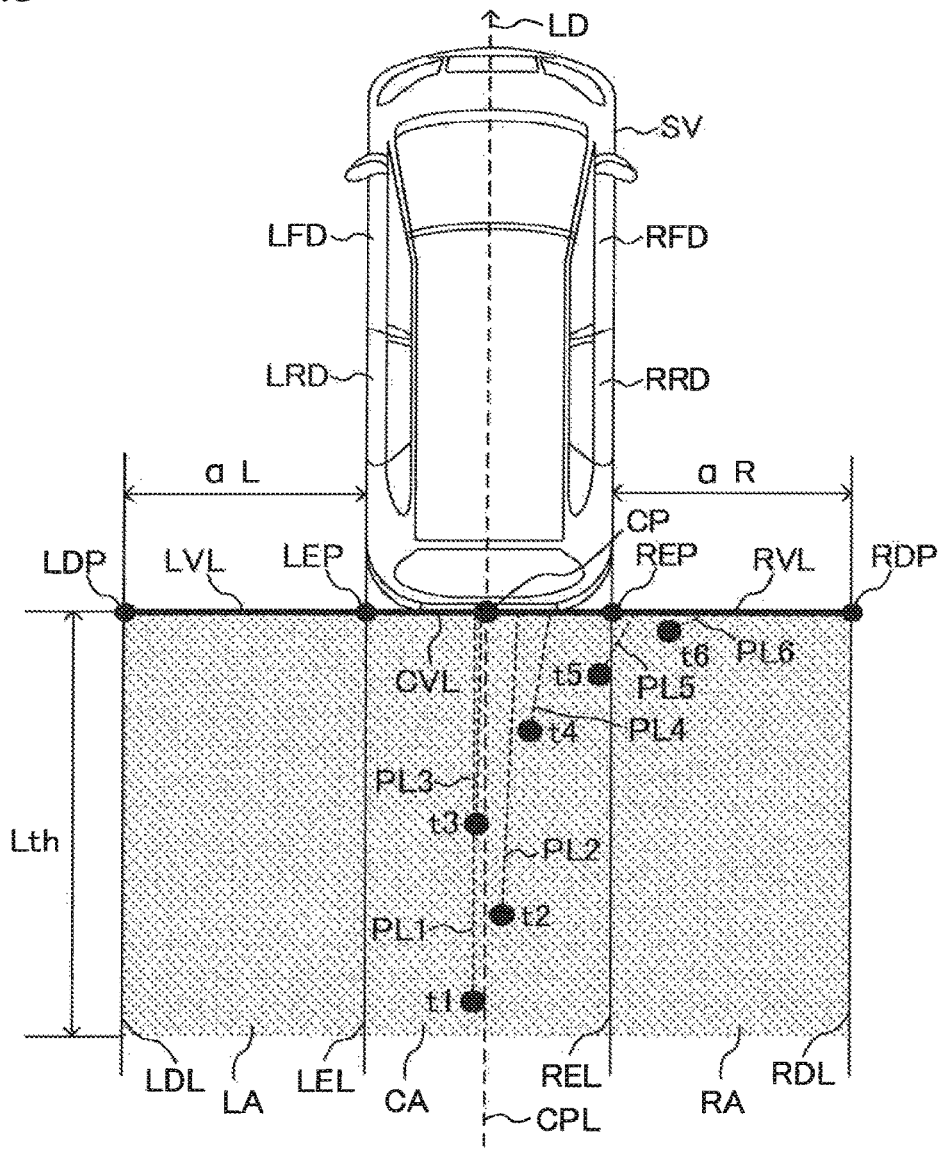

REAR VIEW MONITORING DEVICE

BACKGROUND

Technical Field

The present embodiment relates to a rear view monitoring device (vehicle control device having a rear view monitoring function) configured to perform preliminary control for preventing an occupant from performing an operation of opening at least one of a left door or a right door when an object positioned behind a vehicle satisfies a predetermined control condition.

Related Art

Hitherto, there has been known a rear view monitoring device (hereinafter referred to as "related-art device") configured to warn an occupant of a vehicle of detection of an object (moving body) approaching from behind the vehicle during a period in which the vehicle is stopped (refer to, for example, paragraphs 0002, 0009, and 0010 of Japanese Patent Application Laid-open No. 2002-22828). With this warning, the occupant of the vehicle can recognize that an object is approaching from behind. As a result, it is possible to reduce the possibility of the occupant performing an operation of opening a door when an object is approaching the vehicle from behind.

More specifically, the related-art device uses a sensor to detect an object approaching from behind the vehicle. Next, the related-art device evaluates a danger level of the object based on a distance between the object and the vehicle, a movement speed of the object, and a movement direction of the object.

The related-art device issues a warning when the danger level is equal to or larger than a predetermined danger level.

SUMMARY

In general, a vehicle includes a left door and a right door. In a case where the rear view monitoring device determines only whether there is an object approaching the stopped vehicle from behind the vehicle, even when any one of left and right doors can be opened, the rear view monitoring device is required to issue a warning on the effect that both the left and right doors are prohibited from being opened. This may cause an occupant trying to leave the vehicle to feel an inconvenience. Meanwhile, when the rear view monitoring device can determine whether an object approaching from behind the vehicle is likely to collide with the left door or the object is likely to collide with the right door, the rear view monitoring device can issue a warning on the effect that only the door with which the object is likely to collide is prohibited from being opened.

In view of the above, the inventors of the present embodiment have discussed a rear view monitoring device for consideration described below. When an object is predicted to reach a left virtual line segment, the rear view monitoring device for consideration determines that the object is likely to collide with the left door, and performs left preliminary control (e.g., warning) for preventing an occupant from performing an operation of opening the left door. The left virtual line segment is a virtual line segment connecting between a "center portion at a rear end of the vehicle in a vehicle width direction" and a "position away from a left end portion of the rear end of the vehicle toward left in the vehicle width direction by a predetermined distance". Meanwhile, when an object is predicted to reach a right virtual line segment, such a rear view monitoring device for consideration determines that the object is likely to collide with the right door, and performs right preliminary control (e.g., warning) for preventing the occupant from performing an operation of opening the right door. The right virtual line segment is a virtual line segment connecting between the center portion and a "position away from a right end portion of the rear end of the vehicle toward right in the vehicle width direction by a predetermined distance".

A certain type of object (in particular, a two-wheeled vehicle including a motorbike and a bicycle) may pass through a nearby area of the side of the vehicle after suddenly changing its traveling path in an area just behind and very close to the vehicle. It is difficult to determine whether an object which will suddenly change its traveling path is to pass through the nearby area of the left side of the vehicle or the nearby area of the right side of the vehicle until the object starts to suddenly change its traveling path. Thus, a virtual line segment that such an object is predicted to reach alternately changes during a period before the sudden change of the traveling path. Thus, the rear view monitoring device for consideration may frequently switch preliminary control for the door of a side through which the object is to pass, and as a result, the door of the side through which the object is to pass may be opened.

The present embodiment has been made to solve the above-mentioned problem. In other words, the present embodiment has an object to provide a rear view monitoring device configured to perform more appropriate preliminary control for an "object approaching a stopped vehicle from behind the vehicle and then passing through a nearby area of a side of the vehicle".

A rear view monitoring device according to one embodiment (hereinafter sometimes referred to as "embodiment device") is to be applied to a vehicle including a left door (LFD, LRD) and a right door (RFD, RRD), and includes: an object detector (21L, 21R, 20, 10, and Step 502) configured to detect a position of an object positioned in a rear side of the vehicle with respect to the vehicle; and a controller (31, 32, 33LF, 33RF, 33LP, 33RR, and 10) configured to execute, during a period in which the vehicle is stopped ("Yes" in Step 503), preliminary control (Step 524, Step 526, and Step 536 to Step 540) for preventing an occupant of the vehicle from performing an operation of opening at least one of the left door or the right door when the object satisfies one of predetermined conditions ("Yes" in Step 514, "Yes" in Step 516, and "Yes" in Step 518). The controller is configured to: execute (Step 540 and Step 542), as the preliminary control, left-side preliminary control for preventing the occupant from performing an operation of opening the left door by determining satisfaction of a left-side control condition, which is one of the predetermined control conditions, when the object Is predicted to reach a left virtual line segment (LVL) ("Yes" in Step 518) based on a position of the object, the left virtual line segment connecting between a first left, predetermined position (LEP), which is away from a center portion (CP) at a rear end (RE) of the vehicle in a vehicle width direction (WD) toward left in the vehicle width direction by a first left predetermined distance, and a second left predetermined position (LDP), which is away from the first left predetermined position toward left in the vehicle width direction by a second left predetermined distance (αL) and is positioned toward left in the vehicle width direction compared to a left side of the vehicle; execute (Step 536 and Step 538), as the preliminary control, right-side preliminary control for preventing the occupant from performing an operation of opening the right door by determining satisfaction of a right-side control condition, which is one of the predetermined control conditions, when the object is predicted to reach a right virtual line segment (RVL) ("Yes" in Step 516) based on the position of the object, the right virtual line segment connecting between a first right predetermined position (REP), which is away from the center portion toward right in the vehicle width direction by a first right predetermined distance, and a second right predetermined position (RDP), which is away from the first right predetermined position toward right in the vehicle width direction by a second right predetermined distance (αR) and is positioned toward right in the vehicle width direction compared to a right, side of the vehicle; and execute (Step 524 and Step 526), as the preliminary control, both-side preliminary control for preventing the occupant from performing an operation of opening both of the left door and the right door by determining satisfaction of a both-side control condition, which is one of the predetermined control conditions, when the object is predicted to reach a central virtual line segment (CVL) ("Yes" in Step 514) based on the position of the object, the central virtual line segment connecting between the first left predetermined position and the first right predetermined position.

Even in a case where the object approaches the vehicle from just behind the vehicle, suddenly changes its traveling path toward the left side or the right side when the distance to the vehicle becomes relatively short, and passes through the nearby area of the side of the vehicle, it is likely that the object is predicted to reach the central virtual line segment before the sudden change of the traveling path. Thus, the embodiment device is likely to per form both-side preliminary control before the object suddenly changes its traveling path. With this, it is possible to reduce the possibility of the occupant opening the doors of both sides before the object suddenly changes its traveling path, and reduce the possibility of the occupant opening the door of a side through which the object is to pass.

Further, it is likely that the object after suddenly changing its traveling path is predicted to reach the virtual line segment of a side through which the object is to pass among the left virtual line segment and the right virtual line segment. Thus, the embodiment, device is likely to perform preliminary control for only a side in which the object is to collide among the left-side preliminary control and the right-side preliminary control after the object suddenly changes its traveling path. As a result, the embodiment device is likely to avoid continuing preliminary control for both of the left and right doors after the object suddenly changes its traveling path. With this, it is possible to reduce the possibility of the occupant feeling inconvenience.

In one aspect of the present embodiment, the controller is configured to: acquire the position of the object detected by the object detector every time a predetermined period elapses (Step 502); predict (Step 528) a movement direction of the object based on a current position of the object and a history of the position of the object when another object that is identified to be the same as the object has been detected at a current time point and past time points by a predetermined number of times or more ("Yes" in Step 522); determine ("Yes" in Step 518) satisfaction ox the left-side control condition when a predicted movement line (PL) extending from the current position of the object along the movement direction intersects with the left virtual line segment ("No" in Step 730); determine ("Yes" in Step 516) satisfaction of the right-side control condition when the predicted movement line intersects with the right virtual line segment ("Yes" in Step 730); and determine ("Yes" in Step 514) satisfaction of the both-side control condition when the predicted movement line intersects with the central virtual line segment ("Yes" in Step 720).

The virtual line segment to be reached by the object is predicted based on the virtual line segment with which the predicted movement line extending from the current position of the object along the movement direction of the object intersects. Thus, it is possible to more accurately predict the virtual line segment to be reached by the object. With this, preliminary control corresponding to the accurately predicted virtual line segment is executed, and thus it is possible to reduce the possibility of the occupant opening the door of a side in which the object is likely to collide.

In one aspect of the present embodiment, the controller is configured to: determine ("Yes" in Step 518) satisfaction of the left-side control condition when a predetermined left-side area condition is satisfied, the predetermined left-side area condition including a condition that the object is positioned in a left-side area (LA) between a first left predetermined line segment (LEL) extending from the first left predetermined position toward a rear side of the vehicle and a second left predetermined line segment (LDL) extending from the second left predetermined position toward the rear side of the vehicle ("Yes" in Step 615); determine ("Yes" in Step 516) satisfaction of the right-side control condition when a predetermined right-side area condition is satisfied, the predetermined right-side area condition including a condition that the object is positioned in a right-side area (RA) between a first right predetermined line segment (REL) extending from the first right predetermined position toward the rear side of the vehicle and a second right predetermined line segment (RDL) extending from the second right predetermined position toward the rear side of the vehicle ("Yes" in Step 610); and determine ("Yes" in Step 514) satisfaction of the both-side control condition when a predetermined central-area condition is satisfied, the predetermined central-area condition including a condition that the object is positioned in a central area (CA) between the first left predetermined line segment and the first right predetermined line segment ("Yes" in Step 605).

With this, the virtual line segment to be reached by the object is predicted based on in which area the object is positioned, and thus it is possible to reduce the load of processing for predicting the virtual line segment to be reached by the object.

In one aspect of the present embodiment, the controller is configured to: acquire (Step 502) the position of the object detected by the object detector every time a predetermined period elapses; in a case where another object that is identified to be the same as the object has been detected at a current time point and past time points by a predetermined number of times or more ("Yes" in Step 522): predict (Step 528) a movement direction of the object based on a current position of the object and a history of the position of the object; determine ("Yes" in Step 518) satisfaction of the left-side control condition when a predicted movement line (PL) extending from the current position of the object along the movement direction intersects with the left virtual line segment ("No" in Step 730); determine ("Yes" in Step 516) satisfaction of the right-side control condition when the predicted movement line intersects with the right virtual line segment ("Yes" in Step 730); and determine ("Yes" in Step 514) satisfaction of the both-side control condition when the predicted movement line intersects with the central virtual line segment ("Yes" in Step 720); and in a case where another object that is identified to be the same as the object has not been detected at the current time point and past time points by the predetermined number of times or more ("No" in Step 522): determine ("No" in Step 518) satisfaction of the left-side control condition when a predetermined left-side area condition is satisfied, the predetermined left-side area condition including a condition that the object is positioned in a left-side area (LA) between a first left predetermined line segment (LEL) extending from the first left predetermined position toward a rear side of the vehicle and a second left predetermined line segment (LDL) extending from the second left predetermined position toward the rear side of the vehicle ("Yes" in Step 615); determine ("Yes" in Step 516) satisfaction of the right-side control condition when a predetermined right-side area condition is satisfied, the predetermined right-side area condition including a condition that the object is positioned in a right-side area (RA) between a first right predetermined line segment (REL) extending from the first right predetermined position toward the rear side of the vehicle and a second right predetermined line segment (RDL) extending from the second right predetermined position toward the rear side of the vehicle ("Yes" in Step 610); and determine ("Yes" in Step 514) satisfaction of the both-side control condition when a predetermined central-area condition is satisfied, the predetermined central area condition including a condition that the object is positioned in a central area (CA) between the first left predetermined line segment and the first right predetermined line segment ("Yes" in Step 605).

The movement direction of the object is predicted based on the history of the position of another object identified to be the same as the object, and thus when another object identified to be the same as the object has been detected in the past by a predetermined number of times or more, the accuracy of predicting the movement direction of the object is improved. As a result, the prediction accuracy in a case where another object identified to be the same as the object has not been detected by a predetermined number of times or more is likely to be lower than that in a case where another object identified to be the same as the object has been detected by the predetermined number of times or more. The error of the movement direction of the object influences prediction of the virtual line segment to be reached by the object more compared to the error of the position of the object. Before another object identified to be the same is detected by a predetermined number of times or more, the virtual line segment to be reached by the object is predicted based on in which area the object is positioned. With this, even in a period (namely, a period in which the accuracy of predicting the movement direction of the object is low) before another object identified to be the same is detected by a predetermined number of times or more, it is possible to accurately predict the virtual line segment to be reached by the object. Further, the accuracy of predicting the movement direction of the object is improved after another object identified to be the same has been detected by a predetermined number of times or more, and thus the virtual line segment to be reached by the object is predicted based on the virtual line segment with which the predicted movement line intersects. With this, it is possible to more accurately predict the virtual line segment to be reached by the object after another object identified to be the same has been detected by a predetermined number of times or more.

In one aspect of the present embodiment, the controller is configured to determine ("Yes" in Step 514) satisfaction of the both-side control condition when both of the left-side control condition and the right-side control condition are satisfied.

With this, when there are an object predicted to reach the left virtual line segment and an object predicted to reach the right virtual line segment, the embodiment device can reduce the possibility of the occupant opening the doors of both sides, and can thus reduce the possibility of colliding with those objects.

In the above description, in order to facilitate understanding of the present embodiment, components of the present embodiment corresponding to an example of the present embodiment described later are assigned with names and/or reference symbols used in that embodiment with parentheses. However, the respective components of the present embodiment are not limited to those of the example defined by the names and/or reference symbols. Other objects, other features, and accompanying advantages of the present embodiment would be understood easily from the description of the embodiment of the present embodiment described with reference to the drawings.

BRIEF DESCRIPTION OF THE DRAWINGS

FIG. 3 is a diagram for illustrating an outline of an operation of this monitoring device in a case where an object approaches from behind.

FIG. 4 is a time chart for illustrating control performed by this monitoring device in the example illustrated in FIG. 3.

DETAIL DESCRIPTION

Figure 1:
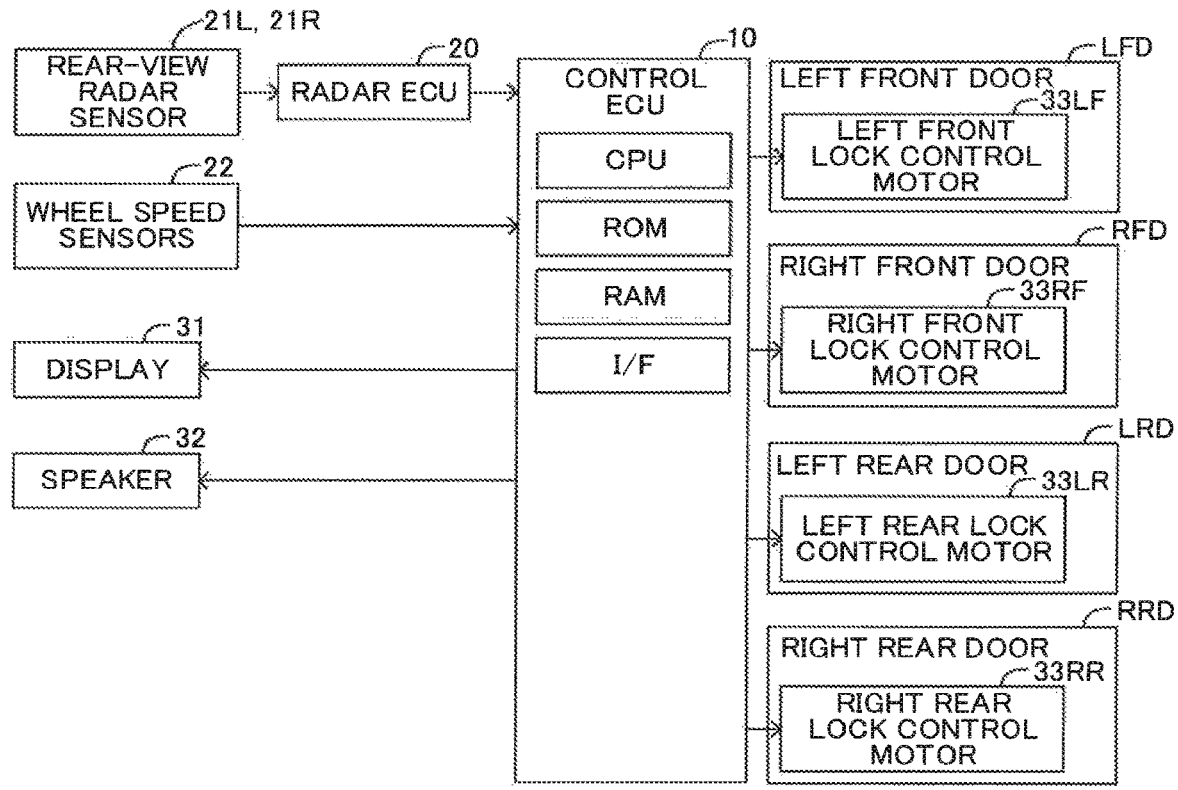
FIG. 1 is a schematic system configuration diagram for illustrating a rear view monitoring device (this monitoring device) according to an embodiment.

A rear view monitoring device (hereinafter sometimes referred to as "this monitoring device") according to an embodiment is applied to a vehicle. As illustrated in FIG. 1, this monitoring device includes a control ECU 10 and a radar ECU 20. Those ECUs may be integrated into one ECU.

Those ECUs are each an electronic control unit including a microcomputer as a principal unit, and are connected to other ECUs (not shown) via a controller area network (CAN) (not shown) so as to enable mutual transmission and reception of information. In this specification, the microcomputer includes, for example, a CPU, a ROM, a RAM, a non-volatile memory, and an interface I/F. The CPU executes an instruction (program or routine) stored in the ROM to archive various functions.

Figure 2:
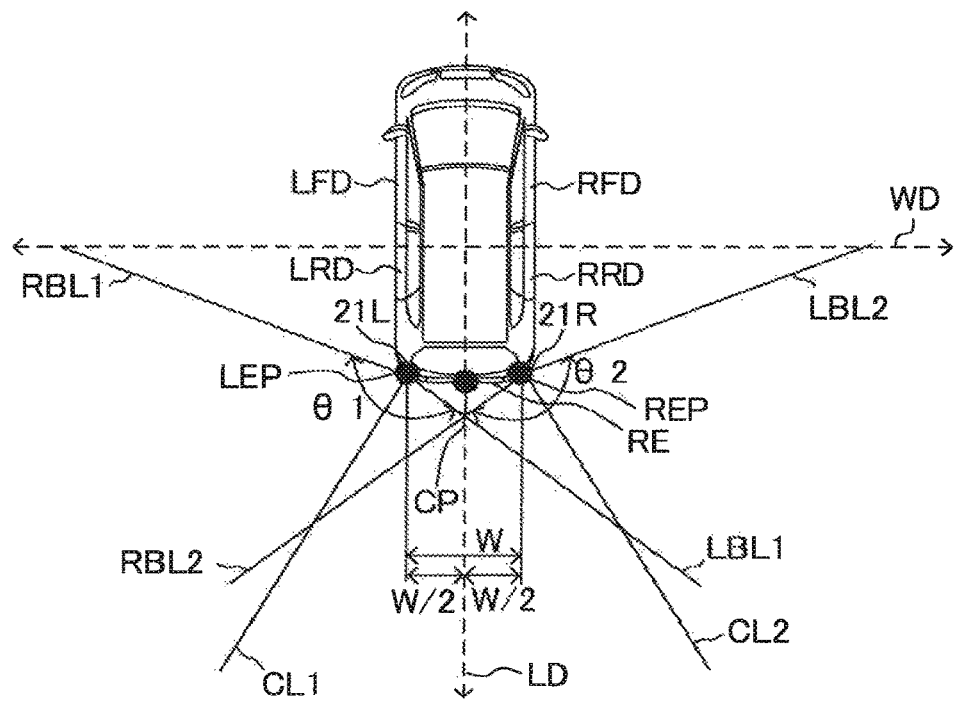
FIG. 2 is an explanatory diagram for illustrating a mounting position and detection range of each of rear-view radar sensors illustrated in FIG. 1.

The radar ECU 20 is connected to a rear-view radar sensor (left rear-view radar sensor) 21L and a rear-view radar sensor (right rear-view radar sensor) 21R. As illustrated in FIG. 2, the rear-view radar sensor 21L is mounted to a left end portion LEP of a rear end RE of the vehicle, and the rear-view radar sensor 21R is mounted to a right end portion REP of the rear end RE of the vehicle. When the rear-view radar sensors 21L and 21R are not required to be distinguished from each other, those sensors are referred to as "rear-view radar sensor 21".

The left end portion LEP is positioned away from a center portion CP of the rear end RE toward left in a vehicle width direction WD by half (W/2) (hereinafter also referred to as "first left predetermined distance") a vehicle width W. The right end portion REP is positioned away from the center portion CP toward right in the vehicle width direction WD by half (W/2) (hereinafter also referred to as "first right predetermined distance") the vehicle width.

The rear-view radar sensor 21 is a widely known sensor, and is configured to transmit a radio wave (hereinafter also referred to as "quasi-millimeter wave") of a quasi-millimeter-wave band toward a detection range, and receive a quasi-millimeter wave (reflected wave) reflected by an object present in the detection range. Then, every time a predetermined period of time elapses, the rear-view radar sensor 21 transmits, to the radar ECU 20, transmission/reception data including, for example, a period of time from transmission of a quasi-millimeter wave until reception of e reflected wave of the quasi-millimeter wave, a direction of the reflected wave, and a phase difference between the transmitted quasi-millimeter wave and the received reflected wave.

As illustrated in FIG. 2, an area (detection area) in which the rear-view radar sensor 21L can detect an object is a fan-shaped area extending from a right boundary line RBL1 to a left boundary line LBL1. A detection axis CL1 being a bisector of an angle θ1 formed by the right boundary line RBL1 and the left boundary line LBL1 extends from the left end portion LEP in the left rear direction of the vehicle. Thus, the rear-view radar sensor 21L mainly detects an object positioned in the left rear direction of the vehicle.

Similarly, a detection area of the rear-view radar sensor 21R is a fan-shaped area extending from a right boundary line RBL2 to a left boundary line LBL2. A detection axis CL2 being a bisector of an angle θ2 formed by the right boundary line RBL2 and the left boundary line LBL2 extends from the right end portion REP in the right rear direction of the vehicle. Thus, the rear-view radar sensor 21R mainly detects an object positioned in the right rear direction of the vehicle.

As can be understood from FIG. 2, the detection area of each of the rear-view radar sensors 21L and 21R covers an area just behind the vehicle. Thus, the rear-view radar sensors 21L and 21R can also detect an object positioned just behind the vehicle. The detection area of the rear-view radar sensor 21L and the detection area of the rear-view radar sensor 21R overlap with each other just behind the vehicle.

Referring back to FIG. 1 again, the radar ECU 20 calculates a "longitudinal distance and horizontal distance" of an object based on the transmission/reception data transmitted from the rear-view radar sensor 21 every time the predetermined period of time elapses. The longitudinal distance is a distance from the vehicle (vehicle body rear end portion) to the object in a direction (refer to FIG. 2) of a vehicle longitudinal axis LD. The horizontal distance is a distance (horizontal distance) from a vehicle center portion in the vehicle width direction WD (refer to FIG. 2), which is a direction orthogonal to the vehicle longitudinal axis LD. That is, the radar ECU 20 identifies (acquires) the position of the object with respect to the vehicle. Further, the radar ECU 20 acquires a "speed (namely, relative speed of object) in the direction of the vehicle longitudinal axis LD" of the object with respect to the vehicle based on the transmission/reception data transmitted from the rear-view radar sensor 21. The radar ECU 20 calculates the relative speed of the object as a positive speed when the object is approaching the vehicle, calculates the relative speed of the object as a negative speed when the object is moving away from the vehicle, or calculates the relative speed of the object as "0" when the object is stationary with respect to the vehicle.

This monitoring device includes wheel speed sensors 22, a display 31, a speaker 32, a left front, lock control motor 33LF, a right front lock control motor 33RF, a left rear lock control motor 33LR, and a right rear lock control motor 33RR in addition to "the control ECU 10, the radar ECU 20, and the rear-view radar sensor 21" described above. Those components are connected to the control ECU 10. Those components may be connected to an ECU other than the control ECU 10. In this case, the control ECU 10 receives signals from those components via the ECU to which those components are connected or transmits signals (e.g., drive signals and instruction signals) to those components via the ECU to which those components are connected. When the left front lock control motor 33LF, the right front lock control motor 33RF, the left rear lock, control motor 33LR, and the right rear lock control motor 33RR are not required to be distinguished from one another, those motors are referred to as "lock control motor 33". Further, those components may also be referred to as "lock unit".

Each of the wheel speed sensors 22 is provided for each wheel of the vehicle, and generates one pulse signal (wheel pulse signal) every time each wheel rotates by a predetermined angle. The control ECU 10 measures the number of pulses of a wheel pulse signal transmitted from each of wheel speed sensors 22 in a unit time, and calculates the rotation speed (wheel speed) of each wheel based on the measured number of pulses. The control ECU 10 calculates a vehicle speed Vs representing a speed of the vehicle based on the wheel speed of each wheel. For example, the control ECU 10 calculates an average value of the wheel speeds of four wheels as the vehicle speed Vs.

The display 31 is a head-up display (herein& referred to as "HUD") for receiving a display signal from the control ECU 10, and displaying display information represented by the display signal on a partial area (display area) of a windshield of the vehicle. The display 31 may be a single or plurality of liquid crystal displays. Such liquid crystal displays are provided at a position where the occupant of the vehicle can see the liquid crystal displays.

When the speaker 32 receives an output signal serving as an instruction to output a warning sound from the control ECU 10, the speaker 32 outputs the warning sound in response to the received output signal.

The left front lock control motor 33LF is installed inside the left front door LFD. The left front door LFD is turned by an operation of opening the door by the occupant, and opens toward the left side of the vehicle body.

The right front lock control motor 33RF is installed inside the right front door RFD. The right front door RFD is turned by an operation of opening the door by the occupant, and opens toward the right side of the vehicle body.

The left rear lock control motor 33LR is installed inside the left rear door LRD. The left rear door LRD is turned by an operation of opening the door by the occupant, and opens toward the left side of the vehicle body.

The right rear lock control motor 33RR is installed inside the right rear door RRD. The right rear door RRD is turned by an operation of opening the door by the occupant, and opens toward the right side of the vehicle body.

Each lock control motor 33 can rotate in a lock direct ion and an unlock direction opposite to the lock direction. When each lock control motor 33 rotates in the lock direction and reaches a predetermined lock position, a door having the lock control motor 33 installed therein is locked. Then, even when the occupant performs a door opening operation for opening the locked door, the locked door is not opened. On the contrary, when each lock control motor 33 rotates in the unlock direction and reaches a predetermined lock position, a door having the lock control motor 33 installed therein is unlocked. Then, the occupant can open the door toward the outside of the vehicle by performing a door opening operation for opening the unlocked door.

(Outline of Operation)

Next, a description is given of an outline of the operation of this monitoring device with reference to FIG. 3.

When the vehicle is stopped and the occupant of the vehicle is trying to leave the vehicle, the occupant opens a door. The occupant has a difficulty in recognizing a rear view of the vehicle compared to the front view of the vehicle, and thus may open the door when an object is approaching from behind the vehicle. Thus, when an object is approaching from behind the vehicle toward the vehicle during a period in which the vehicle is stopped, this monitoring device issues a warning so that the occupant does not open a door. Control of issuing such a warning is referred to as "warning control" or "preliminary control". This preliminary control reduces the possibility that the occupant opens a door when an object is approaching from behind the vehicle toward the vehicle.

A two-wheeled vehicle including a bicycle and a motor-bike often approaches the vehicle from an area just behind the stopped vehicle, suddenly changes its traveling path when a distance to the vehicle becomes relatively short, and after that, passes through (makes its way through) a nearby area of the side of the vehicle. This monitoring device also monitors an object positioned in an area just behind the vehicle so that this monitoring device can issue a warning for an object that passes through the nearby area of the side of the vehicle after suddenly changing its traveling path in addition to a warning for an object that passes through the nearby area of the side of the vehicle from diagonally behind the vehicle without changing its traveling path.

In view of the above, the inventors of the present embodiment have developed a monitoring device (hereinafter referred to as "rear view monitoring device for consideration" for convenience) described below.

As illustrated in FIG. 3, the rear view monitoring device for consideration divides in advance a virtual line segment connecting between a left predetermined position LDP and a right predetermined position RDP into a left virtual line segment, and a right virtual line segment at the center portion CP of the rear end RE of the vehicle in the vehicle width direction WD. That is, the left virtual line segment is a line segment connecting between the left predetermined position LDP and the center portion CP, and the right virtual line segment is a line segment connecting between the right predetermined position RDP and the center portion CP. The left predetermined position LDP is a position away from the left end portion LEP of the rear end RE of the vehicle by a left predetermined distance αL (hereinafter also referred to as "second left predetermined distance αL") toward left in the vehicle width direction WD. Similarly, the right predetermined position RDP is a position away from the right end portion REP of the rear end RE of the vehicle by a right predetermined distance αR (hereinafter also referred to as "second right predetermined distance αR") toward right in the vehicle width direction WD.

Then, when an object is predicted to reach the left virtual line segment, the rear view monitoring device for consideration issues a left-side warning, whereas when the object is predicted to reach the right virtual line segment, the rear view monitoring device for consideration issues a right-side warning. As described later in detail, the left-side warning (left-side control) is a warning (control) for preventing the occupant from performing an operation of opening the left doors (left front door LFD and left rear door LRD). Similarly, the right-side warning (right-side control) is a warning (control) for preventing the occupant from performing an operation of opening the right doors (left front door LFD and left rear door LRD). The rear view monitoring device for consideration uses the following approach to determine a virtual line segment to which the object is predicted to reach.

The rear view monitoring device for consideration calculates, as a "predicted movement line", a "line extending from a current position of the object in a direction in which the object is predicted to move at the current position of the object". When the rear view monitoring device for consideration determines that the predicted movement line intersects with the left virtual line segment, the rear view monitoring device for consideration predicts that the object reaches the left virtual line segment, whereas when the rear view monitoring device for consideration determines that the predicted movement line intersects with the right virtual line segment, the rear view monitoring device for consideration predicts that the object reaches the right virtual line segment.

Now, a case of the object (e.g., two-wheeled vehicle) suddenly changing its traveling path and then passing through the nearby area of the side of the vehicle is considered. It is assumed that for example, this object is detected by a predetermined number of times or more since before a certain time point t1, and is detected as an object that is positioned at locations t1 to t6 illustrated in FIG. 3 at the respective time points t1 to t6. Further, it is assumed that the predicted movement line of the object at each of the time points t1 to t6 is calculated to be each of predicted movement line segments PL1 to PL6. In this example, the predicted movement line segment PL1 intersects with the left virtual line segment, the predicted movement line segment PL2 intersects with the right virtual line segment, the predicted movement line segment PIA intersects with the left virtual line segment, and each of the predicted movement line segments PL4 to PL6 intersects with the right virtual line segment. Thus, as shown in part (A) of FIG. 4, the rear view monitoring device for consideration alternately issues a left-side warning (left-side control) and a right-side warning (right-side control) during a period between the Lime point t1 and the time point t3, and issues a right-side warning (right-side control) after the time point t5. A period (period between the time point t1 and the time point t5 in part (A) of FIG. 4) in which the right-side warning and the left-side warning are alternately issued every time a control period elapses may be referred to as an "alternate warning (alternate control) period".

The left-side warning and the right-side warning are alternately issued during the alternate warning period, and thus the occupant cannot immediately grasp which doors of the left side or the right side are prohibited from being opened among the left doors LTD and LRD and the right doors RFD and RRD. Further, the left-side warning and the right-side warning are alternately issued, and thus the warning itself becomes gradually unreliable for the occupant. As a result, the occupant Trey open a door of a side through which the object is to pass.

This monitoring device has solved the above-mentioned problem of the rear view monitoring device for consideration in the following manner. That is, this monitoring device divides in advance a virtual line segment connecting between the left predetermined position LDP and the right predetermined position RDP into three line segments, namely, "left virtual line segment LVL, central virtual line segment CVL, and right virtual line segment RVL" illustrated in FIG. 3. The left virtual line segment LVL is a virtual line segment connecting between the left predetermined position LDP and the left end portion LEP. The right virtual line segment RVL is a virtual line segment connecting between the right predetermined position RDP and the right end portion REP. The central virtual line segment CVL is a virtual line segment connecting between the left, end portion LEP and the right end portion REP.

When the predicted movement, line segment PL intersects with the left virtual line segment LVL, this monitoring device predicts that the object reaches the left virtual line segment LVL, and issues the left-side warning. When the predicted movement line segment PL intersects with the right virtual line segment RVL, this monitoring device predicts that the object reaches the right virtual line segment RVL, and issues the right-side warning. Further, when the predicted movement line segment PL intersects with the central virtual line segment CVL, this monitoring device predicts that the object reaches the central virtual line segment CVL, and issues a both-side warning. The both-side warning (both-side control) is a warning (control) for preventing the occupant from opening both doors of the left side and the right side.

In the example illustrated in FIG. 3 described above, as illustrated in part (B) of FIG. 4, this monitoring device issues the both-side warning during the period between the time point t1 and the time point t5, and issues the right-side warning after the time point t5.

During the period between the time point t1 and the time point t5, it is not possible to determine whether the object is to pass through the nearby area of the right side of the vehicle or the nearby area of the left side of the vehicle, or is to stop behind the vehicle so as not to pass through the nearby area of the side of the vehicle. This monitoring device issues the both-side warning in this period. Thus, the occupant can clearly grasp the fact that the doors of both sides are prohibited from being opened. Therefore, it is possible to reduce the possibility of the occupant opening the door of a side through which the object is to pass when the object passes through the nearby area of the side of the vehicle.

(Specific Operation)

Figure 5:
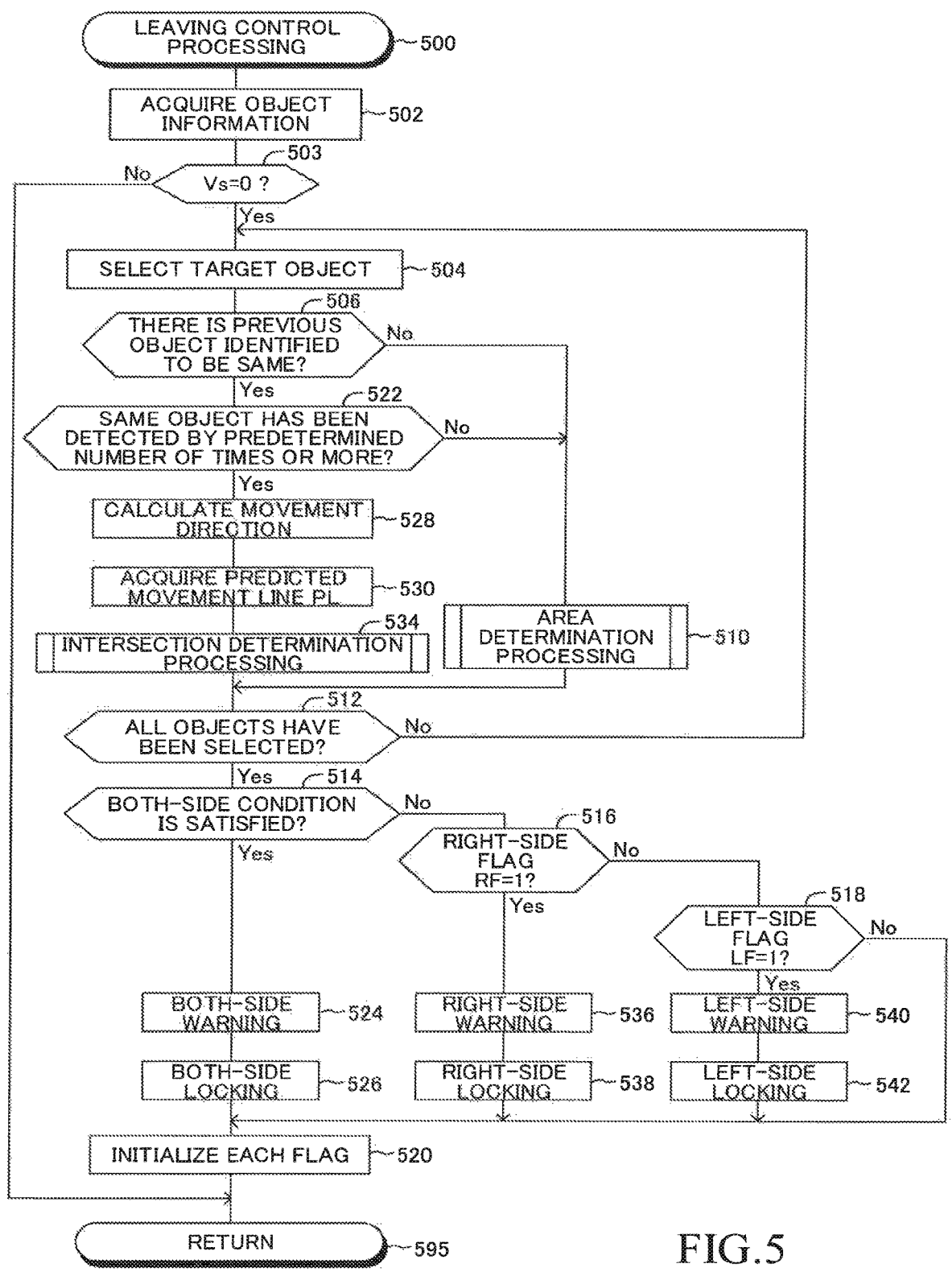
FIG. 5 is a flowchart for illustrating a routine executed by a CPU of a control ECU illustrated in FIG. 1.

The CPU of the control ECU 10 executes a routine illustrated in FIG. 5 every time a predetermined period Δt elapses.

Thus, when a predetermined timing has arrived, the CPU starts processing from Step 500 of FIG. 5, and advances to Step 502 to acquire object information f rom the radar ECU 20. This object information contains, for example, information (longitudinal distance and horizontal distance) on the position of the object detected by the rear-view radar sensor 21 and the relative speed of the object. Then, the CPU advances to Step 503 to acquire the vehicle speed Vs based on a pulse signal from each of the wheel speed sensors 22 and determine whether the acquired vehicle speed Vs is "0".

When the vehicle speed Vs is not "0", that is, when the vehicle is not stopped, the CPU makes a "No" determination in Step 503, and directly advances to Step 595 to tentatively terminate this routine.

On the contrary, when the vehicle speed Vs is "0", that is, when the vehicle is stopped, the CPU makes a "Yes" determination in Step 503, and executes processing of Step 504 and Step 506 described below in order. In the following, the description is continued on the assumption that the vehicle continues to be stopped (that is, the vehicle speed Vs continues to be "0").

Step 504: The CPU selects, as a target object (namely, object to be processed), one object from among objects (hereinafter referred to as "current object") whose positions are identified (detected) based on information on positions contained in the object information acquired in Step 502. In the following, the description is continued on the assumption that there is only one current object, namely, there is only one target object.

Step 506: The CPU determines whether there is another object identified to be the same as the target object among "previously detected objects". The previously detected objects are objects whose positions have been identified based on the object information when the CPU has executed this routine the predetermined period Δt before the current time point, and are hereinafter referred to as "previous object".

Now, the processing of Step 506 is described in detail.

When the CPU recognizes that the target object is an object that has been firstly detected (identified) for the first Lime this time, the CPU predicts (calculates) the longitudinal distance of the previous object at the current time point on the assumption that the "previous object has moved from the previous position in the direction of the vehicle longitudinal axis LD at the previously detected relative speed during the predetermined period Δt". After that, the CPU determines whether the longitudinal distance of the target object falls within a "predetermined longitudinal distance range that has beer, set based on the predicted longitudinal distance of the previous object" and whether the horizontal distance of the target object falls within a "predetermined horizontal distance range that has been set based on the predicted horizontal distance of the previous object.". Then, when the longitudinal distance of the target object falls within the predetermined longitudinal distance range and the horizontal distance of the target object falls within the predetermined horizontal distance range, the CPU determines that the previous object is the same object as the target object. In this case, the CPU stores, into the RAM, the fact that the previous object is the same object, as the target object.

On the contrary, when there is a previous object stored in the RAM as the same object as the target object, for the target object, the CPU determines whether the RAM stores, as the same object as the previous object, an "object (further previous object) that was detected before identification (detection) of the previous object by the predetermined period Δt".

When the RAM does not store such a further previous object, the CPU performs processing similar to the above-mentioned processing for a case in which the target object is recognized as an object that has been detected (identified) for the first time this time, to thereby determine whether there is a previous object that can be determined to be the same as the target object.

On the contrary, when the RAM stores such a further previous object, the CPU calculates the movement direction and the movement speed of the previous object based on each position of the "further previous object and previous object", which have been determined to be the same object. Then, the CPU calculates, as a "predicted position", a "position (position at current time point) of the previous object on the assumption that the previous object has moved from the previous position at the movement speed of the previous object along the movement direction of the previous object during the predetermined period Δt". Next, the CPU determines whether the position of the target object "falls within the predetermined range from the predicted position". That is, the CPU determines whether the position of the target object can be determined to substantially match the predicted position. When the CPU determines that the position of the target object "fails within the predetermined range from the predicted position", the CPU determines (recognizes) the previous object to be the same as the target object, and stores that fact into the RAM.

The CPU performs the above-mentioned processing for all the previous objects (all the objects that, have been identified at a time point before the current time point by the predetermined period Δt).

It is now assumed that a target object has been detected for the first time (that is, the same object as the target object is not identified at the time point before the current time point by the predetermined period Δt), and thus there is no previous object that can be determined to be the same as the target object. In this case, the CPU makes a "No" determination in Step 506, and advances to Step 510 to execute area determination processing. The area determination processing is processing of determining in which of a left-side area LA, a center area CA, and a right-side area RA the target object is positioned and whether the target object is not positioned in any of those areas. The area determination processing is processing of predicting which of the virtual line segments LVL, CVL, and RVL the target object is to reach.

As illustrated in FIG. 3, the left-side area LA, the center area CA, and the right-side area RA are defined as follows.

The left-side area LA is an area between a left-end line segment LEL and a left predetermined line segment LDL.

The center area CA is an area between the left-end line segment LEL and a right-end line segment REL.

The right-side area PA is an area between the right-end line segment REL and a right predetermined line segment RDL.

The left-end line segment LEL is a line segment that extends from the left end portion LEP toward the rear side of the vehicle in parallel to the vehicle longitudinal axis LD by a predetermined distance Lth.

The left predetermined line segment LDL is a line segment that extends from the left predetermined position LDP toward the rear side of the vehicle in parallel to the vehicle longitudinal axis LD by the predetermined distance Lth.

The right-end line segment REL is a line segment that extends from the right end portion REP toward the rear side of the vehicle in parallel to the vehicle longitudinal axis LD by the predetermined distance Lth.

The right predetermined line segment RDL is a line segment that extends from the right predetermined position RDP toward the rear side of the vehicle in parallel to the vehicle longitudinal axis LD by the predetermined distance Lth.

Figure 6:
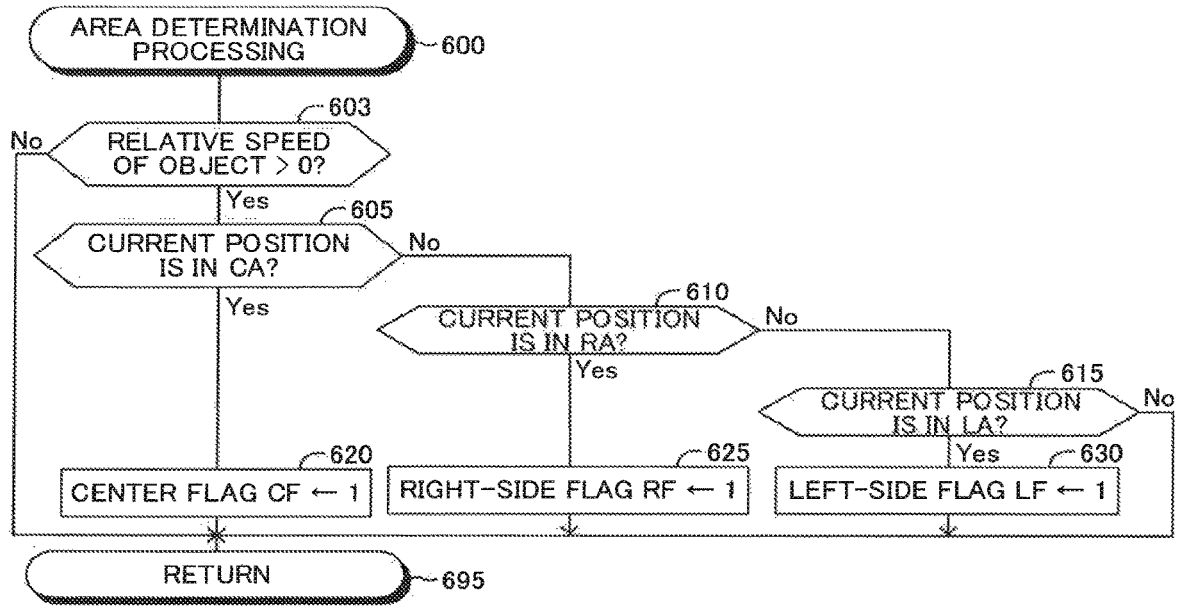
FIG. 6 is a flowchart for illustrating a routine executed by the CPU of the control ECU in area determination processing of the routine illustrated in FIG. 5.

When the CPU advances to Step 510 illustrated in FIG. 5, the CPU starts processing from Step 600 of FIG. 6 to advance to Step 603. In Step 603, the CPU determines whether the relative speed of the target object is higher than "0".

When the relative speed of the target object is equal to or lower than "0", that is, when the target object is stationary with respect to the vehicle or is moving away from the vehicle, the CPU makes a "No" determination in Step 603, advances to Step 695 to tentatively terminate this routine, and advances to Step 512 illustrated in FIG. 5.

On the contrary, when the relative speed of the target; object is higher than "0", that is, when the target object is approaching the vehicle, the CPU makes a "Yes" determination in Step 603 to advance to Step 605.

In Step 605, the CPU determines whether the target object is positioned in the center area CA. It is now assumed that the longitudinal distance of the target object is longer than the predetermined distance Lth, and thus the target object is not positioned in any of the areas LA, CA, and RA. In this case, the CPU makes a "No" determination in Step 605, and advances to Step 610 to determine whether the target object is positioned in the right-side area RA.

With the above-mentioned assumption, the CPU makes a "No" determination in Step 610, and advances to Step 615 to determine whether the target object is positioned in the left-side area LA. Further, with the above-mentioned assumption, the CPU makes a "No" determination in Step 615, advances to Step 695 to tentatively terminate this routine, and advances to Step 512 illustrated in FIG. 5.

The values of the center flag CF, the left-side flag LF, and the right-side flag RF described later are set to "0" when an ignition key switch (not shown) is changed from an off position to an on position. Further, those flags are set to "0" in Step 520 described later of the routine illustrated in FIG. 5. With the above-mentioned assumption, the target object is not positioned in any of the areas LA, CA, and RA, and thus no processing of Step 620 and Step 630 described later is executed. Thus, when the routine illustrated in FIG. 6 described above is terminated, all the flags remain to be set to "0".

In Step 512 illustrated in FIG. 5, the CPU determines whether all the current objects have been selected as the target object. With the "assumption that there is only one current object" described above, all the current objects have beer, selected as the target object, and thus the CPU makes a "Yes" determination in Step 512 to advance to Step 514.

In Step 514, the CPU determines whether a both-side condition is satisfied. More specifically, when at least one of the following condition (1) or (2) is satisfied, the CPU determines that the both-side condition is satisfied.

Condition (1): The value of the center flag CF is set to "1".
Condition (2): The value of the left-side flag LF is set to "1" and the value of the right-side flag RF is set to "1".

With the assumption that the "target object is not positioned in any of the areas LA, CA, and RA", all the flags are set to "0" at the current time point. That is, the both-side condition is not satisfied, and thus the CPU makes a "No" determination in Stop 514 and advances to Step 516 to determine whether the value of the right-side flag RF is set to "1". In this case, the value of the right-side flag RF is set to "0", and thus the CPU makes a "No" determination in Step 516, and advances to Step 518 to determine whether the value of the left-side flag LF is set to "1". In this case, the value of the left-side flag LF is "0", and thus the CPU makes a "No" determination in Step 518, advances to Step 520 to set the value of each flag (left-side flag LF, center flag CF, and right-side flag RF) to "0", and advances to Step 595 to tentatively terminate this routine. As a result, no warning is issued, and no door of any side is locked. In other words, no preliminary control is executed.

After that, when the predetermined period Δt elapses and the CPU starts the processing of this routine again to advance to Step 504 via Step 502 and Step 503, the CPU newly selects a target object and advances to Step 506. At this time point, it is assumed that there is a previous object that can be determined to be the same as the target object. In this case, the CPU makes a "Yes" determination in Step 506, and advances to Step 522.

In Step 522, the CPU determines whether the target object and the same object as the target object have been detected by a predetermined number of times (e.g., even number of times of 6 or more) or more continuously. In other words, the CPU determines whether a certain object has been detected (identified) by a predetermined number of times or more continuously.

It is now assumed that the same object as the target object has not been detected by a predetermined number of times or more. In this case, the CPU makes a "No" determination in Step 522, and advances to Step 510 to execute the area determination processing. It is now assumed that the target object in this case has become closer to the vehicle compared to the time (the previous time of execution of the routine illustrated in FIG. 5) before the predetermined period Δt, and a distance between the target object and the vehicle has become equal to or shorter than the predetermined distance Lth.

Further, when the target object is positioned in the center area CA, that target object is likely to reach the central virtual line segment CVL. Thus, in this case, the CPU makes "Yes" determinations in both of Step 603 and Step 605, and advances to Step 620 to set the value of the center flag CF to "1". After that, the CPU advances to Step 695 to tentatively terminate the routine illustrated in FIG. 6, and advances to Step 512 illustrated in FIG. 5.

With the above-mentioned "assumption that there is only one current object", the CPU makes a "Yes" determination in Step 512 to advance to Step 514. At this time, the value of the center flag CF is set to "1", and thus the CPU makes a "Yes" determination in Step 514 and executes processing of Step 524 and Step 526 described below in the stated order.

Step 524: The CPU issues a both-side warning. More specifically, the CPU transmits, to the display 31, a display signal for displaying a both-side warning screen on the display 31. The both-side warning screen is a screen for preventing an occupant from performing an operation of opening the left doors (left front door LFD and left rear door LRD) and an operation of opening the right doors (right front door RFD and right rear door RRD). Further, the CPU transmits, to the speaker 32, an output, signal, for causing the speaker 32 to output a "both-side warning sound for preventing the occupant from performing an operation of opening the left doors and an operation of opening the right doors". For example, the both-side warning screen and the both-side warning sound may contain a warning message such as "Object is approaching. Please do not open the doors of both left and right sides."

Step 526: The CPU executes both-side locking for automatically locking the left front door LFD, the left rear door LRD, the right front door RFD, and the right rear door RRD. That is, the CPU automatically locks the front and rear doors of the left side and the front and rear doors of the right side. More specifically, the CPU transmits a locking drive signal to each of the left front lock control motor 33LF, the left rear lock control motor 33LR, the right front lock control motor 33RF, and the right rear lock control motor 33RR. When each lock control motor 33 receives a locking drive signal, the lock control motor 33 rotates in the lock direction until the lock control motor 33 reaches the lock position, to thereby lock each door.

Then, the CPU advances to Step 520 to initialize each flag, and advances to Step 595 to tentatively terminate this routine.

Meanwhile, it is now assumed that the target object is positioned in the right-side area RA when the CPU starts processing from Step 600 of FIG. 6 in order to execute the processing of Step 510 of FIG. 5. In this case, the target object is likely to reach the right virtual line segment RVL, and thus the CPU makes a "Yes" determination in Step 603, makes a "No" determination in Step 605, and makes a "Yes" determination in Step 610. Then, the CPU advances to Step 625, and sets the value of the right-side flag RF to "1". After that, the CPU advances to Step 512 illustrated in FIG. 5 via Step 695.

With the above-mentioned "assumption that there is only one current object", the CPU makes a "Yes" determination in Step 512 and advances to Step 514. In this case, the value of the right-side flag RF is "1", and the values of the center flag CF and the left-side flag LF are both "0". That is, the both-side condition is not satisfied, and thus the CPU makes a "No" determination in Step 514 to advance to Step 516. Further, the CPU makes a "Yes" determination in Step 516, and executes the processing of Step 536 and Step 538 described below in the stated order.

Step 536: The CPU issues a right-side warning. More specifically, the CPU transmits, to the display 31, a display signal for causing the display 31 to display a "right-side warning screen for preventing the occupant from performing an operation of opening the right doors (right front door RFD and right rear door RRD)". Further, the CPU transmits, to the speaker 32, an output signal for causing the speaker 32 to output a "right-side warning sound for preventing the occupant from performing an operation of opening the right doors". For example, the right-side warning screen and the right-side warning sound may contain a warning message to such as "Object is approaching the right side of the vehicle. Please do not open the doors of the right side."

Step 538: The CPU executes right-side locking for automatically locking the right front door RFD and the right rear door RRD. That is, the CPU automatically locks the front and rear doors of the right side. More specifically, the CPU transmits a locking drive signal to each of the right front lock control motor 33RF and the right rear lock control motor 33RR.

Then, the CPU advances to Step 520 to initialize each flag, and advances to Step 595 to tentatively terminate this routine.

Meanwhile, it is now assumed that the target object is positioned in the left-side area LA when the CPU starts processing from Step 600 of FIG. 6 in order to execute the processing of Step 510 of FIG. 5. In this case, the target object is likely to reach the left virtual line segment LVL, and thus the CPU makes a "Yes" determination in Step 603, makes "Mo" determinations in both of Step 60b and Step 610, and makes a "Yes" determination in Step 615. Then, the CPU advances to Step 630, and sets the value of the left-side flag LF to "1". After that, the CPU advances to Step 512 illustrated in FIG. 5 via Step 695.

With the above-mentioned "assumption that there is only one current object", the CPU makes a "Yes" determination in Step 512 and advances to Step 514. In this case, the value ox the left-side flag LF is "1", and the values of the center flag CF and the right-side flag RF are both "0". Thus, the CPU makes "No" determinations in both of Step 514 and Step 516, and makes a "Yes" determination in Step 518 to execute the processing of Step 540 and Step 542 described below in the stated order.

Step 540: The CPU issues a left-side warning. More specifically, the CPU transmits, to the display 31, a display signal for causing the display 31 to display a "left-side warning screen for preventing the occupant from performing an operation of opening the left doors (left front door LFD and left rear door LRD)". Further, the CPU transmits, to the speaker 32, an output signal for causing the speaker 32 to output a "left-side warning sound for preventing the occupant from performing an operation of opening the left doors". For example, the left-side warning screen and the left-side warning sound may contain a warning message to such as "Object is approaching the left side of the vehicle. Please do not open the doors of the left side."

Step 542: The CPU executes left-side locking for automatically locking the left front door LFD and the left rear door LRD. That is, the CPU automatically locks the front and rear doors of the left side. More specifically, the CPU transmits a locking drive signal to each of the left front lock control motor 33LF and the left rear lock control motor 33LR.

Then, the CPU advances to Step 520 to initialize each flag, and advances to Step 595 to tentatively terminate this routine.

It is now assumed that, after that, an appropriate period of time elapses, and the same object as the target object has been detected by a predetermined number of times or more. In this case, when the CPU advances to Step 522, the CPU makes a "Yes" determination in Step 522, and executes the processing of from Step 528 to Step 534 described below in the stated order to advance to Step 512.

Step 528: The CPU estimates the movement direction of the target object at the current time point based on the position of the target object and the history of the position of the object that has been determined to be the same as the target object.

Step 528 is described more in detail.

First, the CPU selects the position of the target object and a predetermined number (in this example, 2M being an even number) of latest positions from the history of positions of the object that has been determined to be the same as the target object. Then, the CPU pairs the "position of the object at a certain time point (time point ta)" with the "position of the object at a time point (time point ta−Δt·M) before the time point (time point ta) by a period (Δt·M) corresponding to half the predetermined number (M)" among the selected predetermined number (2M) of positions of the object. The CPU pairs all the predetermined number of selected objects with one another in accordance with this approach.

After that, the CPU calculates a straight line passing through the positions of the two paired objects for the number (M) of pairs. Then, the CPU counts, for each straight line, the number of objects positioned within a predetermined distance from each calculated straight line among the positions of the predetermined number of selected objects. The CPU selects a straight line having the maximum number of counted objects, and estimates a "direction toward the position of the target object at the current time point" of the selected straight line as the movement direction of the target object at the current time point. Then, the CPU estimates that the target object continues to move in the future along this movement direction.

The CPU may calculate, by a least squares method, for example, an approximated straight line for the position of the target object at the current time point and the positions of the predetermined number of selected objects, which have been determined to be the same object as the target object. Then, the CPU may estimate the "direction toward the position of the target object at the current time point" of that straight line as the movement direction of the target object at the current time point.

Step 530: The CPU acquires, as the predicted movement line segment PL, a half line that extends in the movement direction of the target object: calculated in Step 528 from the position of the target object at the current time point.

Step 534: The CPU identifies a virtual line segment with which the predicted movement line segment FL intersects among the virtual line segments LVL, CVL, and RVL. This processing is intersection determination processing for predicting which of the virtual line segments LVL, CVL, and RVL the target object reaches. In actuality, when the CPU advances to Step 534, the CPU executes a sub-routine illustrated in the flowchart of FIG. 7.

Figure 7:
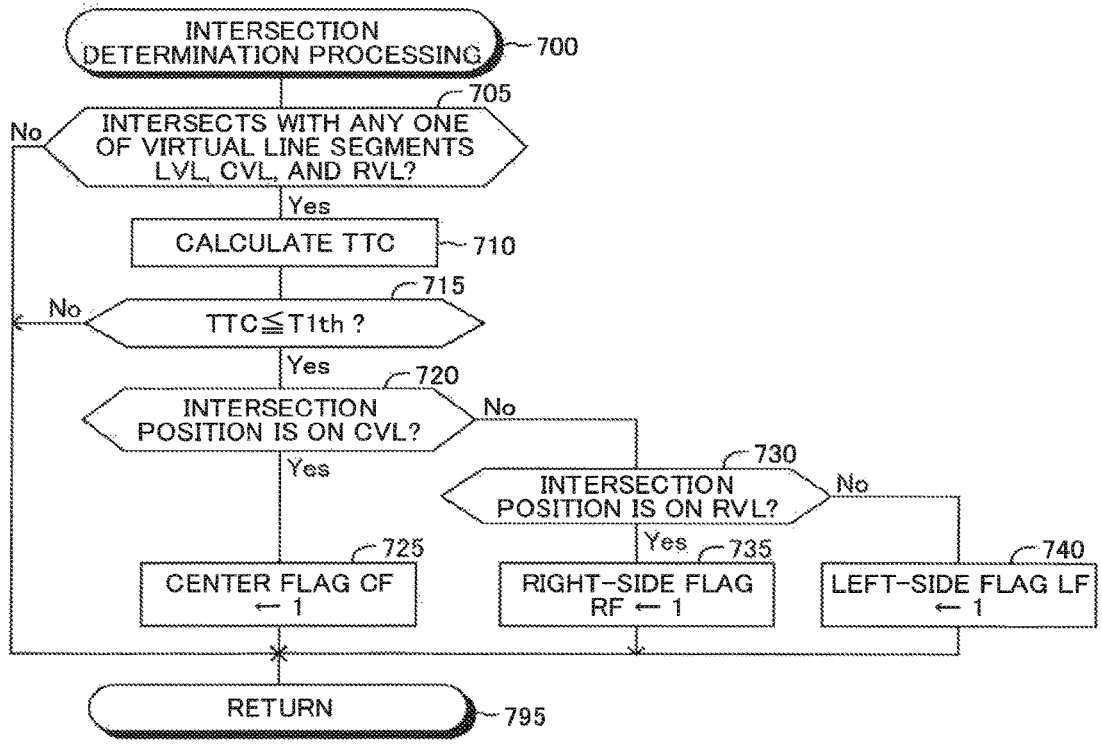
FIG. 7 is a flowchart for illustrating a routine to be executed by the CPU of the control ECU in intersection determination processing of the routine illustrated in FIG. 5.

That is, when the CPU advances to Step 534, the CPU starts processing from Step 700 of FIG. 7 to advance to Step 705. In Step 705, the CPU determines with which of the virtual line segments LVL, CVL, and RVL the predicted movement line segment PL acquired in Step 530 illustrated in FIG. 5 intersects. When the predicted movement line segment PL intersects with any one of the virtual line segments, the CPU makes a "Yes" determination in Step 705, and executes the processing of Step 710 described below to advance to Step 715.

Step 710: The CPU calculates a time to collision (TTC) of the target object.

The time to collision TTC is calculated by dividing the longitudinal distance of the target object by the relative speed of the target object.

The time to collision TTC in a case where the intersection position is positioned on the central virtual line segment CVL can be said to be a time T1 (time from current time point to predicted collision time point) until the target object is predicted to collide with the vehicle. Meanwhile, the time to collision TTC in a case where the intersection position is positioned on the left virtual line segment LVL or the right virtual line segment RVL can be said to be a time T2 (time from current time point to predicted closest-position time point) until the target object, which is likely to pass through the side of the vehicle, becomes closest to the vehicle.

In other words, this time to collision TTC is a time until the target object reaches a "virtual line segment connecting between the left predetermined position LDP and the right, predetermined position RDP" in a case where the target object moves while maintaining the relative speed and the movement direction at the current time point.

Step 715: The CPU determines whether the time to collision TTC calculated in Step 710 is equal to or shorter than a predetermined threshold time T1th.

When the time to collision TTC is equal to or shorter than the threshold time T1th, the CPU makes a "Yes" determination in Step 715, and advances to Step 720 to determine whether the intersection position is positioned on the central virtual line segment CVL.

When the intersection position is positioned on the central virtual line segment CVL, the CPU makes a "Yes" determination in Step 720, and advances to Step 725 to set the value of the center flag CF to "1". As a result, the value of the center flag CF is set to "1", and the values of the right-side flag RF and the left-side flag LF are set to "0". After that, the CPU advances to Step 795 to tentatively terminate the routine illustrated in FIG. 7, and advances to Step 512 illustrated in FIG. 5.

With the above-mentioned "assumption that there is only one current object", the CPU makes a "Yes" determination in Step 512, and further, the both-side condition is satisfied in this case. Thus, the CPU makes a "Yes" determination in Step 514, and executes the above-mentioned "processing of Step 524 and Step 526" in the stated order. As a result, a both-side warning is issued, and both-side locking is executed. After that, the CPU advances to Step 520 to initialize each flag, and advances to Step 595 to tentatively terminate this routine.

Meanwhile, it is assumed that the target object has suddenly changed its traveling path toward the right side to pass through a nearby area of the right side of the vehicle immediately before execution of the processing of Step 720 of FIG. 7 by the CPU, with the result that the intersection position becomes positioned on the right virtual line segment RVL. In this case, the CPU makes a "No" determination in Step 720, and advances to Step 730 to determine whether the intersection position is positioned on the right virtual line segment RVL. In this case, the intersection position is positioned on the right virtual line segment RVL, and thus the target object is likely to reach the right virtual line segment RVL. Thus, the CPU makes a "Yes" determination in Step 730, and advances to Step 735 to set the value of the right-side flag RF to "1". After that, the CPU advances to Step 512 illustrated in FIG. 5 via Step 795.

With the above-mentioned "assumption that there is only one current object", the CPU makes a "Yes" determination in Step 512, and advances to Step 514. In this case, the value of the right-side flag RF is set to "1", and the values of the other flags CF and LF are set to "0". That is, the both-side condition is not satisfied, and thus the CPU makes a "No" determination in Step 514 to advance to Step 516. The value of the right-side flag RF is set to "1", and thus the CPU makes a "Yes" determination in Step 516, and issues the above-mentioned right-side warning in Step 536. Further, the CPU advances to Step 538 to execute right-side locking. Then, the CPU advances to Step 520 to initialize each flag, and advances to Step 595 to tentatively terminate this routine.

Meanwhile, it is assumed that the target object has suddenly changed its traveling path toward the left side to pass through a nearby area of the left side of the vehicle immediately before execution of the processing of Step 720 of FIG. 7 by the CPU, with the result that the intersection position becomes positioned on the left virtual line segment LVL. Thus, the target object is likely to reach the left virtual line segment LVL. In this case, the CPU makes a "Yes" determination in Step 720, makes a "No" determination in subsequent Step 730, and advances to Step 740 to set the value of the left-side flag LF to "1". After that, the CPU advances to Step 512 illustrated in FIG. 5 via Step 795.

With the above-mentioned "assumption that there is only one current object", the CPU makes a "Yes" determination in Step 512, and advances to Step 514. In this case, the value of the left-side flag LF is set to "1", and the values of the other flags CF and RF are set to "0". Thus, the CPU makes "No" determinations in both of Step 514 and Step 516 and issues a left-side warning in Step 540. Further, the CPU advances to Step 542 to execute left-side locking. Then, the CPU advances to Step 520 to initialize each flag, and advances to Step 595 to tentatively terminate this routine.

When the target object and the same object as the target object are detected (identified) by a predetermined number of times or more, the accuracy of predicting the movement direction of the target object becomes higher. However, when the target object and the same object as the target object are not detected (identified) by a predetermined number of times or more, the accuracy of predicting the movement direction of the target object is likely to become lower. An error of the movement direction of the target object influences prediction of the virtual line segment to be reached by the target object more compared to an error of the position of the target object. That is, as a distance between the target object and the vehicle becomes longer, the error of the movement direction influences prediction of the virtual line segment more.

Thus, as described above, when the target object and the same object as the target object have not detected by a predetermined number of times or more (Step 506: No, and Step 522: No), this monitoring device predicts the virtual line segment to be reached by the target object based on the area (LA, CA, or RA) including the target object. Further, when the target, object and the same object as the target object have been detected by a predetermined number of times or more (Step 522: Yes), this monitoring device calculates the predicted movement line segment PL of the target object and identifies the virtual line segment (LVL, CVL, or RVL) that the predicted movement line segment PL intersects with, to thereby predict the virtual line segment to be reached by the target object. With this, this monitoring device can accurately predict the virtual line segment to be reached by the object even during a period in which the accuracy of predicting the movement direction of the object is low. Further, this monitoring device can more accurately predict the virtual line segment to be reached by the object during a period in which the accuracy of predicting the movement direction of the object is high.

The description has been given of the operation of this monitoring device based on the assumption that there is only one current object. However, in actuality, a case in which there are a plurality of current objects may occur. In the following, a description is given of the operation of this monitoring device in the case where there are a plurality of current objects based on a situation in which al "assumption (A) to assumption (F)" given below are satisfied.

(Assumption A) There are two current objects, namely, a first object and a second object.

(Assumption B) The first object is an object that has been detected for the first time this time.

(Assumption C) The first object is positioned in the right-side area RA, and the relative speed of the first object is higher than "0".

(Assumption D) Regarding the second object, the second object and the same object as the second object have been detected by a predetermined number of times or more.

(Assumption E) The predicted movement line segment PL of the second object intersects with the left virtual line segment LVL, and the time to collision TTC is equal to or shorter than the threshold time T1th.

(Assumption F) The vehicle speed Vs is "0".

When the CPU advances to Step 503 of FIG. 5, the CPU makes a "Yes" determination in Step 503, and advances to Step 504 (refer to the assumption (F)). Further, the CPU first selects the first object as the target object in Step 504, and advances to Step 506 (refer to the assumption (A)).

With the above-mentioned assumption (B), the CPU makes a "No" determination in Step 506, and advances to Step 510 to start the area determination processing illustrated in FIG. 6. With the above-mentioned assumption (C), the CPU makes a "Yes" determination in Step 603, makes a "No" determination in Step 605, makes a "Yes" determination in Step 610, and advances to Step 625 to set the value of the right-side flag RF to "1". Then, the CPU advances to Step 695 to tentatively terminate the routine illustrated in FIG. 6, and advances to Step 512 illustrated in FIG. 5.

The second object has not been selected as the target object yet, and thus the CPU makes a "No" determination in Step 512, and advances to Step 504 to select the second object as the target object. Then, the CPU advances to Step 506. With the above-mentioned assumption (D), the CPU makes a "Yes" determination in Step 506, and makes a "Yes" determination in Step 522 to advance to Step 528. In Step 528, the CPU calculates the movement direction of the second object being the target object, acquires the predicted movement line segment PL of the second object in Step 530, and advances to Step 534 to start the intersection determination processing illustrated in FIG. 7.

With the above-mentioned assumption (E), the predicted movement line segment PL of the second object intersects with the left virtual line segment LVL, and thus the CPU makes a "Yes" determination in Step 705, calculates the time to collision TTC of the second object in Step 710, and advances to Step 715. With the above-mentioned assumption (E), the CPU makes a "Yes" determination in Step 715 to advance to Step 720, and makes a "No" determination in Step 720 to advance to Step 730. Further, the CPU makes a "No" determination in Step 730, and advances to Step 740 to set the value of the left-side flag LF to "1". After that, the CPU advances to Step 795 to tentatively terminate the routine illustrated in FIG. 7, and advances to Step 512 illustrated in FIG. 5.

All the current objects (first object and second object) have been selected as the target objects until this time point, and thus the CPU makes a "Yes" determination in Step 512 to advance to Step 514. At this time, the value of the right-side flag RF is set to "1" based on the current position of the first object, and the value of the left-side flag LF is set to "1" based on the intersection position of the second object. That is, the both-side condition is satisfied, and thus the CPU makes a "Yes" determination in Step 514 to advance to Step 524. The CPU issues a both-side warning in Step 524, executes both-side locking in Step 526, advances to Step 520 to initialize all the flags, and advances to Step 595 to tentatively terminate this routine.

As can be understood from the above, when there is at least one object that is predicted to reach the central virtual line segment CVL, the value of the center flag CF is set to "1". Thus, the both-side condition is satisfied, and a both-side warning is issued and both-side locking is executed. Similarly, when there is at least one object that is predicted to reach the left virtual line segment LVL and there is at least one object that is predicted to reach the right virtual line segment RVL, the both-side condition is satisfied, and a both-side warning is issued and both-side locking is executed.

Further, when both of the target objects are predicted to reach the right virtual line segment RVL, the value of the right-side flag RF is set to "1", and the values of the center flag CF and the left-side flag LF are both set to "0". In this case, the both-side condition is not satisfied, and thus a both-side warning is not issued, and both-side locking is not executed. Instead, a right-side warning is issued, and right-side locking is executed.

Further, when both of the target objects are predicted to reach the left virtual line segment LVL, the value of the left-side flag LF is set to "1", and the values of the center flag CF and the right-side flag RF are both set to "0". In this case, the both-side condition is not satisfied, and thus a both-side warning is not issued, and both-side locking is not executed. Instead, a left-side warning is issued, and left-side locking is executed.

When the time to collision TTC of the target object at the time of execution of Step 715 illustrated in FIG. 7 is longer than the threshold time T1th, the CPU makes a "No" determination in Step 715, and advances to Step 795 to tentatively terminate this routine. Then, the CPU advances to Step 512 illustrated in FIG. 5.

As described above, this monitoring device divides the virtual line segment connecting between the left predetermined position LDP and the right predetermined position RDP into three line segments, namely, the left virtual line segment LVL, the central virtual line segment CVL, and the right virtual line segment RVL, and predicts which virtual line segment is to be reached by an object that has been detected in the rear side of the vehicle. Then, when the object is predicted to reach the central virtual line segment CVL, this monitoring device determines that the both-side control condition is satisfied, and issues the both-side warning and executes the both-side locking. When the object is predicted to reach the left virtual line segment LVL, this monitoring device determines that the left-side control condition is satisfied, and issues the left-side warning and executes the left-side locking. When the object is predicted to reach the right virtual line segment RVL, this monitoring device determines that the right-side control condition is satisfied, and issues the right-side warning and executes the right-side locking.

With this, even in a case where the object approaches the vehicle from just behind the vehicle, suddenly changes its traveling path toward the left side or the right side when the distance to the vehicle becomes relatively short, and passes through the side of the vehicle, it is likely that the both-side warning is issued and the both-side locking is executed until the object suddenly changes its traveling path. Therefore, the occupant can clearly grasp the fact that the doors of both sides are prohibited from being opened, and it is possible to reduce the possibility of the occupant opening a door when the object is approaching the vehicle.

The present embodiment is not limited to the example described above, and various modification examples of the present embodiment can be adopted.

The left virtual line segment LVL may be a virtual line segment connecting between a first left predetermined position away from the center portion CP toward left in the vehicle width direction WD by a predetermined distance (first left predetermined distance) and a second left predetermined position away from the first left predetermined position by a second left predetermined distance. In this case, the second left predetermined position may be a position away from the center portion CP toward left in the vehicle width direction WO by a distance larger than half (W/2) the vehicle width.

The right virtual line segment RVL may be a virtual line segment connecting between a first right predetermined position away from the center portion CP toward right in the vehicle width direction WD by a predetermined distance (first right predetermined distance) and a second right predetermined position away from the first right predetermined position by a second right predetermined distance. In this case, the second right predetermined position may be a position away from the center portion CP toward right in the vehicle width direction WD by a distance larger than half (W/2) the vehicle width.

The central virtual line segment CVL may be a virtual line segment connecting between the first left predetermined position and the second right predetermined position.

The left end portion LEP can be represented as a first left predetermined position in a case where the first, left predetermined distance is set to any one of "W/2, (W/2)+α1, and (W/2)−α2". The values α1 and α2 ore both positive values. The value α2 is smaller than W/2. The right end portion can be represented as a first left predetermined position in a case where the first right predetermined distance is set to any one of "W/2, (W/2)≦β1, and (W/2)−β2". The values β1 and β2 are both positive values. The value β2 is smaller than W/2.

The left-side area LA, the right-side area RA, and the center area CA are represented as follows.

The left-side area LA is an area between a "first left, predetermined line segment, extending from the first left predetermined position toward the rear side of the vehicle by the predetermined distance Lth" and a "second left predetermined line segment extending from the second left predetermined position toward the rear side of the vehicle by the predetermined distance Lth". In other words, the left-side area LA is a rectangular area connecting between four points, namely, both end points of the first left predetermined line segment and both end points of the second left, predetermined line segment, by a straight line.

The right-side area RA is an area between a "first right predetermined line segment extending from the first right predetermined position toward the rear side of the vehicle by the predetermined distance Lth" and a "second right predetermined line segment extending from the second right predetermined position toward the rear side of the vehicle by the predetermined distance Lth". In other words, the right-side area PA is a rectangular area connecting between four points, namely, both end points of the first right predetermined line segment and both end points of the second right predetermined line segment, by a straight line.

The center area CA is an area between the first left predetermined line segment and the first right predetermined line segment. In other words, the center area CA is a rectangular area connecting between four points, namely, both end points of the first left predetermined line segment and both end points of the first right predetermined line segment, by a straight line.

The number of rear-view radar sensors 21 is not limited to the number illustrated in FIG. 2 as long as the range of from the left predetermined position LDP to the right predetermined position RDP can be detected. For example, a radar sensor may be mounted to the center portion CP in addition to the rear-view radar sensors 21L and 21R.

Further, the rear-view radar sensor 21 may be a sensor configured to detect an object by radiating a wireless medium and receiving the reflected wireless medium. Thus, an infrared radar and a sonar radar may be used as the rear-view radar sensor 21.

Further, a camera sensor configured to photograph the scenery of the rear area of the vehicle may be mounted instead of the rear-view radar sensor 21 or in addition to the rear-view radar sensor 21. This camera sensor is desired to be a stereo camera including a left camera configured to photograph a left image and a right camera configured to photograph the right image. The stereo camera is configured to detect the distance to the object and the direction of the object by using a parallax between the left image and the right image.

Further, the detection result of the rear-view radar sensor 21 and the detection result of the camera sensor may be integrated to detect the object.

Further, in the above-mentioned embodiment, in the both-side warning, the right-side warning, and the left warning (hereinafter referred to as "warning control"), the display 31 displays a warning screen, and the speaker 32 outputs a warning sound. However, at least one of display of the warning screen or output of the warning sound may be executed. Further, at least one of warning control (namely, control for issuing any one of a right-side warning, a left-side warning, and a both-side warning) or locking control (namely, control for executing any one of right-side locking, left-side locking, and both-side locking) is may be executed.

Further, the left predetermined distance αL and the right predetermined distance αR may take the same value, or take different values.

When the vehicle is a two-door vehicle, the left door is provided on the left side of the vehicle body, and the right door is provided on the right side of the vehicle body. Further, even when the vehicle includes a sliding door, the present embodiment may be applied to such a sliding door so that the safety of the occupant is improved.

What is claimed is:

1. A rear view monitoring device, which is to be applied to a vehicle including a left door and a right door, the rear view monitoring device comprising:
  an object detector configured to detect a position of an object positioned in a rear side of the vehicle with respect to the vehicle; and
  a controller configured to execute, during a period in which the vehicle is stopped, preliminary control for preventing an occupant of the vehicle from performing an operation of opening at least one of the left door or the right door when the object satisfies one of predetermined control conditions,
  wherein the controller is configured to:
    execute, as the preliminary control, left-side preliminary control for preventing the occupant from performing an operation of opening the left door by determining satisfaction of a left-side control condition, which is one of the predetermined control conditions, when the object is predicted to reach a left virtual line segment based on a position of the object, the left virtual line segment connecting between a first left predetermined position, which is away from a center portion at a rear end of the vehicle in a vehicle width direction toward left in the vehicle width direction by a first left predetermined distance, and a second left predetermined position, which is away from the first left predetermined position toward left in the vehicle width direction by a second left predetermined distance and is positioned toward left in the vehicle width direction compared to a left side of the vehicle;
    execute, as the preliminary control, right-side preliminary control for preventing the occupant from performing an operation of opening the right door by determining satisfaction of a right-side control condition, which is one of the predetermined control conditions, when the object is predicted to reach a right virtual line segment based on the position of the object, the right virtual line segment connecting between a first right predetermined position, which is away from the center portion toward right in the vehicle width direction by a first right predetermined distance, and a second right predetermined position, which is away from the first right predetermined position toward right in the vehicle width direction by a second right predetermined distance and is positioned toward right in the vehicle width direction compared to a right side of the vehicle;

execute, as the preliminary control, both-side preliminary control for preventing the occupant from performing an operation of opening both of the left door and the right door by determining satisfaction of a both-side control condition, which is one of the predetermined control conditions, when the object is predicted to reach a central virtual line segment based on the position of the object, the central virtual line segment connecting between the first left predetermined position and the first right predetermined position;

determine satisfaction of the left-side control condition when a predetermined left-side area condition is satisfied, the predetermined left-side area condition including a condition that the object is positioned in a left-side area between a first left predetermined line segment extending from the first left predetermined position toward a rear side of the vehicle and a second left predetermined line segment extending from the second left predetermined position toward the rear side of the vehicle;

determine satisfaction of the right-side control condition when a predetermined right-side area condition is satisfied, the predetermined right-side area condition including a condition that the object is positioned in a right-side area between a first right predetermined line segment extending from the first right predetermined position toward the rear side of the vehicle and a second right predetermined line segment extending from the second right predetermined position toward the rear side of the vehicle; and determine satisfaction of the both-side control condition when a predetermined central-area condition is satisfied, the predetermined central-area condition including a condition that the object is positioned in a central area between the first left predetermined line segment and the first right predetermined line segment is satisfied.

2. The rear view monitoring device according to claim 1, wherein the controller is configured to:

acquire the position of the object detected by the object detector every time a predetermined period elapses;

predict a movement direction of the object based on a current position of the object and a history of the position of the object when another object that is identified to be the same as the object has been detected at a current time point and past time points by a predetermined number of times or more;

determine satisfaction of the left-side control condition when a predicted movement line extending from the current position of the object along the movement direction intersects with the left virtual line segment;

determine satisfaction of the right-side control condition when the predicted movement line intersects with the right virtual line segment; and determine satisfaction of the both-side control condition when the predicted movement line intersects with the central virtual line segment.

3. The rear view monitoring device according to claim 1, wherein the controller is configured to:

acquire the position of the object detected by the object detector every time a predetermined period elapses;

in a case where another object that is identified to be the same as the object has been detected at a current time point and past time points by a predetermined number of times or more:

predict a movement direction of the object based on a current position of the object and a history of the position of the object;

determine satisfaction of the left-side control condition when a predicted movement line extending from the current position of the object along the movement direction intersects with the left virtual line segment;

determine satisfaction of the right-side control condition when the predicted movement line intersects with the right virtual line segment; and determine satisfaction of the both-side control condition when the predicted movement line intersects with the central virtual line segment; and in a case where another object that is identified to be the same as the object has not been detected at the current time point and past time points by the predetermined number of times or more:

determine satisfaction of the left-side control condition when the predetermined left-side area condition is satisfied;

determine satisfaction of the right-side control condition when the predetermined right-side area condition is satisfied; and determine satisfaction of the both-side control condition when the predetermined central-area condition is satisfied.

4. The rear view monitoring device according to claim 1, wherein the controller is configured to determine satisfaction of the both-side control condition when both of the left-side control condition and the right-side control condition are satisfied.

5. The rear view monitoring device according to claim 1, wherein the central area is bounded by the central virtual line segment, the first left predetermined line segment, and the first right predetermined line segment.

6. The rear view monitoring device according to claim 5, wherein the central area overlaps a center portion line segment extending from the center portion at the rear end of the vehicle toward the rear side of the vehicle.

7. The rear view monitoring device according to claim 6, wherein the first left predetermined line segment extends toward the rear side of the vehicle in parallel to the first right predetermined line segment and the center portion line segment.

8. The rear view monitoring device according to claim 1, wherein the center area is directly behind the vehicle.

* * * * *